Dec. 8, 1942.  A. M. PANETTIERI  2,304,275
COLLAR
Filed Jan. 14, 1941   2 Sheets-Sheet 1
Fig.1
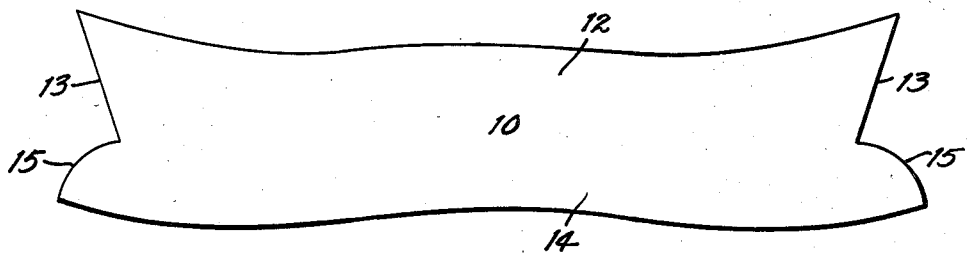
Fig.2.
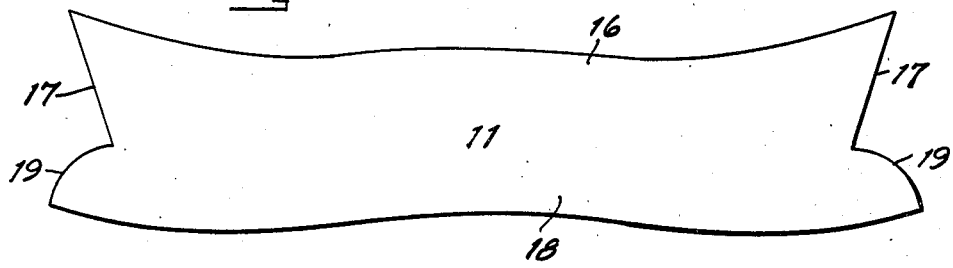
Fig.3.
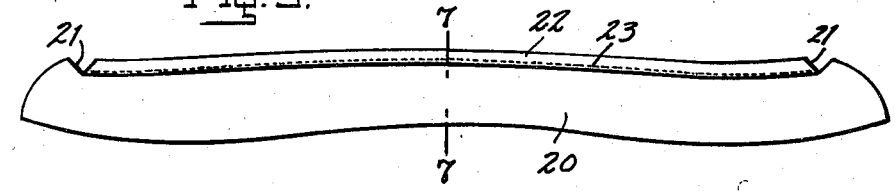
Fig.4.
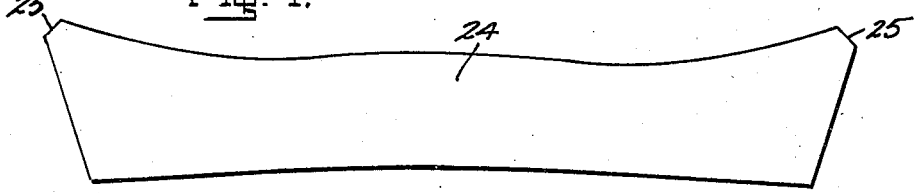
Fig.5.  Fig.6.  Fig.7.
  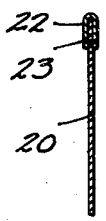
INVENTOR
ANGELO M. PANETTIERI.
BY
ATTORNEY Dec. 8, 1942. A. M. PANETTIERI 2,304,275
COLLAR
Filed Jan. 14, 1941 2 Sheets-Sheet 2
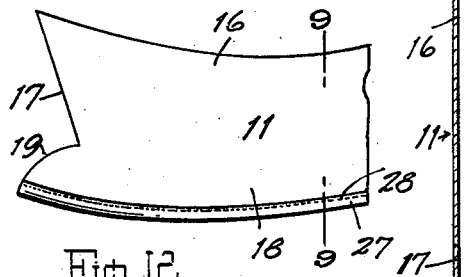
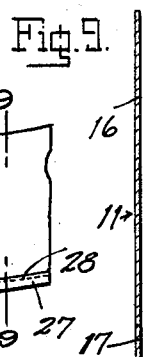
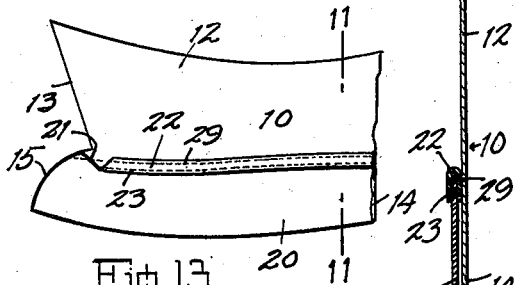
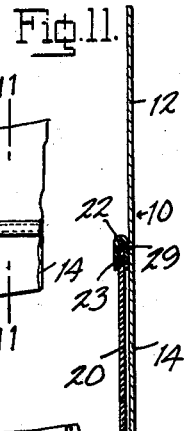
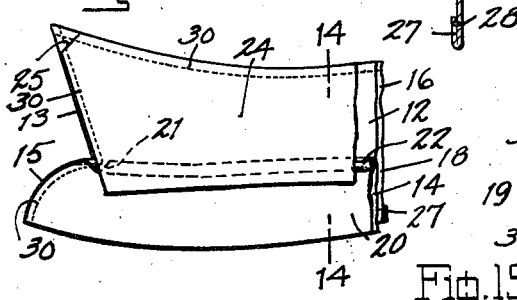
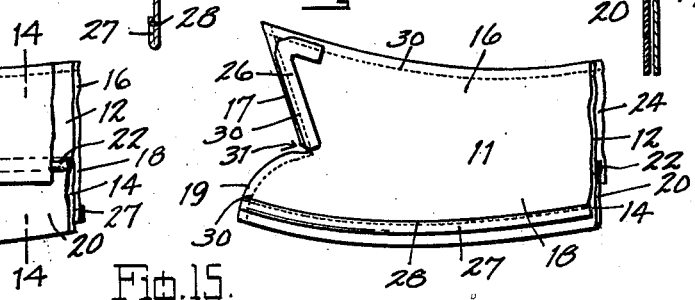
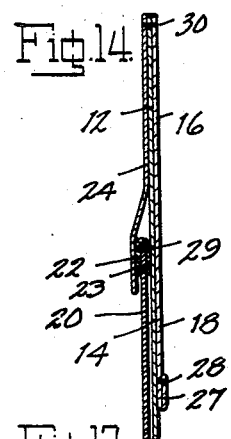
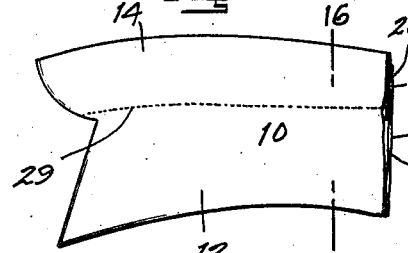
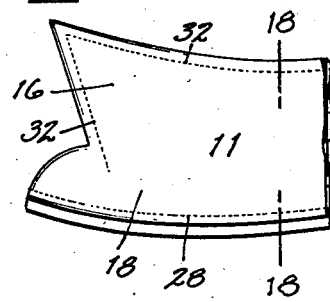
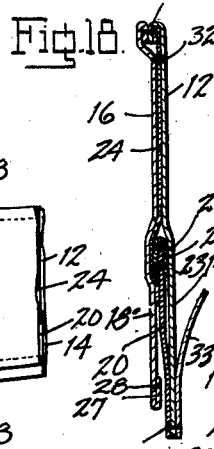
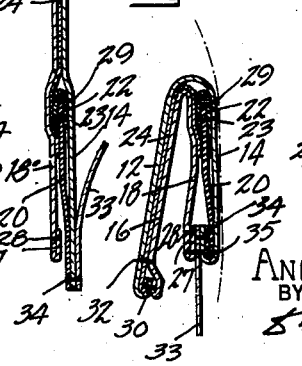
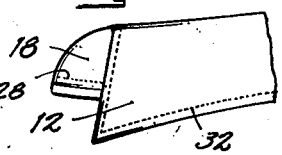
INVENTOR
ANGELO M. PANETTIERI
BY
ATTORNEY Patented Dec. 8, 1942

2,304,275

UNITED STATES PATENT OFFICE 2,304,275

COLLAR

Angelo M. Panettieri, Bridgeport, Conn.

Application January 14, 1941, Serial No. 374,305

2 Claims. (Cl. 2—131)

The present invention relates to an improvement in collars, particularly of the fold down type, and of so-called one-piece construction, in which single or one-piece face forming and back forming layers comprise both the band and the flap portions, as distinguished from so-called two-piece collars in which the band portions are formed of separate pieces of material from the flap portions and are stitched thereto along the fold line. In this type of collar the problem is presented of providing an effective structural fold line which will enable the collar to be folded accurately, will maintain a smooth well fitting fold during use of the collar, and will insure this desirable form of fold after repeated laundering, without requiring any special skill or care on the part of the launderer. It is an object of the present invention to provide a collar structure in which these desirable results are realized.

The invention is also especially concerned with collars of the so-called fused type, in which a stiffening interliner is adhered or cemented between the outer layers of the collar, such interliner being of one of the well known types, in which cellulose acetate or other suitable substance is incorporated, and which is subjected to the action of a re-agent, or to the application of heat, to cause such interliner to adhere to adjacent layers of the collar. In addition to the difficulties which this type of interliner presents, in connection with the production of a proper fold line and the securing of a natural and comfortable fit of the collar, there has been some objection to the effect which such fused interliner has upon the neck of the wearer, this being especially true in the case of a collar structure where the fused interliner is immediately adjacent the outer layer of the collar at a point in contact with the neck of the wearer. Also the effect of perspiration has been found to cause irritation to certain type skins, due to the chemical reaction between the perspiration and the substance of the interliner. It is a further object of the present invention to provide a collar structure in which the interliner is so incorporated in the flap portion of the collar, and extended into the band portion in such manner that the fold line of the interliner is spaced from the neck of the wearer by a soft cushioning edge at the upper end of the band portion in contact with the neck, this cushioning portion extending substantially half way of the fold, so as to protect the skin against contact with the portion of the collar contiguous to the band interliner. It is proposed at the same time to provide the band interliner in the exposed flap portion of the collar and in the outer half of the fold, so that the smooth and fresh appearance of the collar will be effectually maintained and will not be affected by perspiration.

According to the invention the entire surface of the neck band portion and the inner portion of the fold adjacent the neck are entirely free of the stiffening interliner, so that the part of the collar in contact with the neck will be relatively soft. This arrangement furthermore facilitates the shaping of the collar due to the bending differential between the inner and outer surfaces of the fold, the inner surface being relatively soft, while the outer surface is relatively stiff. The arrangement also is such that the back forming layer defining the space between the flap and band has the stiffening interliner in direct contact therewith entirely along the flap portion, around the fold, and partially along the neck band portion, thus providing a tie receiving space having stiffened inner and outer walls which will permit free sliding of the tie engaged therein without tendency to wrinkle or bind the neck band portion in such manner as to cause discomfort.

A further object is to provide a flap interliner which overlaps the band interliner and which is unsecured by stitching at such overlapped portion, either to the band interliner or to the outer and inner layers of the collar, so that this flap interliner which is constructed of relatively thin material will be allowed to assume a flat conforming relation upon turning of the collar and during the processing and pressing operations, thus avoiding the wrinkling that is apt to occur when such interliner is secured by stitching to the relatively coarse material of the band interliner, or to the outer layers of the collar which may be of thicker material or of different weave.

Another object of the invention is to provide a collar in which all of the parts may be accurately cut to shape by suitable dies and in which the assembly of the various parts may be readily carried out under modern factory production methods.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a plan view of one of the one-piece outer layers, namely, the face forming layer which in the finished collar constitutes the exposed surface, that is the inwardly disposed surface of the neck band in contact with the neck and the outer exposed surface of the flap.

Fig. 2 is a plan view of the back forming layer, namely, the layer of the finished collar which constitutes the concealed surface, that is the inner surface of the flap and the outwardly disposed surface of the neck band portion beneath the flap.

Fig. 3 is a plan view of the stiffening interliner of the neck band portion.

Fig. 4 is a plan view of the stiffening interliner of the flap portion.

Fig. 5 is a plan view of one of the edge stiffening members employed to provide a reinforcing stiffening along one end edge of the flap.

Fig. 6 is a similar view of the corresponding stiffening element for incorporation in the other end of the flap.

Fig. 7 is a sectional view, enlarged and exaggerated in cross-section, of the neck band stiffening interliner, taken along the line 7—7 of Fig. 3.

Fig. 8 is a fragmentary plan view of the inner side of one end portion of the back forming layer, showing the lower edge of the band portion provided with a hem.

Fig. 9 is a vertical sectional view thereof, taken along the line 9—9 of Fig. 8.

Fig. 10 is a fragmentary plan view of the inner side of the face forming layer, showing the band stiffening interliner secured thereto.

Fig. 11 is a vertical sectional view, taken along the line 11—11 of Fig. 10.

Fig. 12 is a fragmentary plan view of the assembled portions of the collar before turning, these portions being the back forming layer, hemmed as shown in Fig. 8, the face forming layer provided with stiffening band interliner as shown in Fig. 10, and the flap interliner.

Fig. 13 is a fragmentary plan view of the assembled parts before turning shown at the reverse side from that shown in Fig. 12, and further showing the step in the construction consisting in providing a nick in the corner between the flap and band to facilitate turning.

Fig. 14 is a sectional view, taken along the line 14—14 of Fig. 12.

Fig. 15 is a fragmentary plan view of the turned collar.

Fig. 16 is a vertical sectional view, taken along the line 16—16 of Fig. 15.

Fig. 17 is a fragmentary plan view of the turned collar provided with finishing stitching, and also processed and pressed to cause adherence of the stiffening flap interliner with the surface in contact therewith.

Fig. 18 is a vertical sectional view, taken along the line 18—18 of Fig. 17, and showing the collar partially attached to a shirt.

Fig. 19 is a sectional view similar to Fig. 18 and showing the flap portion folded in its normal folded position with respect to the band portion, showing the collar attached to a shirt, and also showing in dot-and-dash lines the relative position of the wearer's neck.

Fig. 20 is a fragmentary side elevation of the completed collar with the flap portion folded as shown in Fig. 19.

Similar reference characters indicate corresponding parts throughout the several figures of the drawings.

Referring to the drawings, the outer layers, indicated generally as 10 and 11, which form the face and back surfaces of the finished collar, and which are made from any suitable shirt or collar material, are of identical form and may therefore be cut by the same dies and from the same material. The face forming layer 10 consists of a flap portion 12, having its end edges 13—13 cut along straight inclined lines, and a neck band portion 14, having its end portions projecting beyond the ends of the flap portion and cut along the convexly curved lines 15—15, the upper and lower longitudinal edges of the face forming layer being suitably curved to provide the necessary fit. The back forming layer 11, which is identical with the face forming layer, comprises the flap portion 16 having end edges 17—17, and the band portion 18 having projecting curved end edges 19.

The interliner 20 of the band portion of the collar is preferably formed from a relatively stiff coarse material, and corresponds in shape to the band portions of the face and back forming layers 10 and 11, its upper edge, which in the finished collar extends between the corners formed between the end edges of the band and flap portions, being suitably curved to provide the necessary fit around the neck. Near each end of the band interliner 20 there is provided in its upper edge a V-shape notch 21, the arrangement of these notches being such that in the assembled collar they form a free space contiguous to the corners between the end edges of the band and flap portions to facilitate the turning operation, allowing the inturned edges of the material to be accommodated without bunching or crinkling, and in the finished collar also provide a relatively thin end portion at the fold line to facilitate folding.

The upper edge of the band interliner 20 is provided with a binding strip 22 of inverted U-shape in cross-section secured by a row of stitching 23, this binding strip extending at its ends to the inner edges of the notches 21.

The interliner 24 for the flap portion of the collar may be constructed of any suitable lining material, but in the case of processed or fused collars it will be of a suitable processing material, that is, it will be woven with threads of celanese or cellulose acetate, or any other well known materials, which when subjected to a processing step, such as treatment with a solvent or application of heat, causes the interliner to adhere to the adjacent layers of the collar, and thus provide a stiffened wilt-proof structure which does away with the necessity for starching. The material preferably employed in the present invention is a relatively thin fine-weave material, which is substantially thinner than the stiffening band interliner 20 and is also preferably thinner than the face and back forming layers 10 and 11. In shape the flap interliner corresponds substantially to the shape of the flap portions 12 and 16 of the back and face forming layers, except that its lower edge is extended downwardly so that in the finished collar it overlaps the upper portion of the band interliner. Also the peak corners are cut away, as at 25—25, for the purpose of facilitating turning of the collar as will presently more fully appear. While the present structure is particularly advantageous for use with this type of processed interlining, and eliminates many disadvantages heretofore experienced in the use of such interliners, it will be understood that it is not limited to such use.

The reinforcing stiffening members 26—26 of angular shape, and preferably formed of the same fusible material as the flap interliner 24, are adapted to be incorporated in the end edges and peak corners of the flap of the collar for the purpose of giving added stiffness to these edges, and as will presently more fully appear.

The various parts of the collar structure as above outlined are assembled and worked into the finished collar as follows:

Referring to Figs. 8 and 9 the back forming layer 11 is provided at the lower edge of the band portion 18 with a hem 27 folded upon the inner surface and secured by a line of stitching 28. As shown in Figs. 10 and 11 the band interliner 20 is superimposed upon the inner surface of the band portion 14 of the face forming layer 10, and is secured thereto by a line of stitching 29 provided close to the fold of the binding strip 22 in spaced parallel relation to the stitching 23, so that this line of stitching 29 not only provides a fastening for the binding strip in addition to the line of stitching 23, but also secures the binding strip and the band interliner to the face forming layer at a point closely contiguous to the fold line of the collar provided by the folded edge of the binding strip.

The back forming layer 11, with its lower edge hemmed as shown in Fig. 8, and the face forming layer 10, with the band interliner 20 attached as shown in Fig. 10, are placed in superimposed registering relation with the outer surfaces of the layers 10 and 11 in contact with each other, the flap interliner 24 is placed in superimposed registering relation upon the inner surface of the face forming layer 10 with its lower edge overlapping the upper edge of the band interliner, the reinforcing stiffening angular members 26—26 are arranged at the ends of the flap portion in contact with the back forming layer 11, as shown in Fig. 13, and in this assembled relation these parts are thereupon secured together by a line of stitching 30 which extends along the longitudinal edge of the flap portions, along the end edges of the flap portions, and along the curved end edges of the band portions. The corner of this stitching between the flap and band portions is disposed substantially centrally within the notches 21 of the band interliner, and a nick 31 is cut into the marginal portions of the superimposed layers 10 and 11 and the flap interliner 24 which is extended approximately to the corner of the stitching for the purpose of facilitating turning of the collar.

The collar is turned as shown in Fig. 15, and in this turned relation the marginal portions adjacent the nick 31 will be accommodated within the free spaces provided by the notches 21, so that at this point there will be no bunching of material, the arrangement permitting the collar to be pressed into flat smooth relation at these points. The turned collar is thereupon finished, as shown in Fig. 17, by a finishing line of stitching 32, this line of stitching being inwardly of the inturned edges of the flap portion, and extending along the longitudinal and end edges of the flap portion and part way into the band portion. The collar is next suitably processed to cause the band interliner 24 to fuse with the face and back forming layers 10 and 11.

In this fused relation the slight bulge or bead along the edge of the flap portion produced by the inturned edges of the layers projects at the inner or back surface of the flap, the outer or face surface being pressed flat. The flap portions 12 and 16 of the face and back layers are adhered to the flap interliner 24 over their entire surfaces, and the adjacent upper marginal portions of the band portion 18 of the back forming layer 11 and the band interliner 20 are adhered to the portion of the flap interliner which projects into the band. The band portion 14 of the face forming layer 10 is entirely out of contact with the flap interliner 16 so that no adhesion or fusion at this neck engaging band portion takes place. Furthermore the binding 22 provided about the upper edge of the band interliner interposes a triple thickness of material, which prevents any possibility of the adhesive action extending through to the neck engaging band portion of the face forming layer, and at the same time provides a cushioning area which renders the fold portion of the collar where it engages the neck relatively soft and conforming. Also the triple thickness of the upper edge of the band interliner at this point produces in the folded down collar, as shown in Fig. 19, an outwardly flared relatively soft portion at the fold extending from the inner neck engaging surface substantially half way through the fold, so that at this point where the movement of the neck is apt to engage the collar fold the skin is protected against contact with the stiff fused portion of the fold. At the same time the fused portion of the fold extends substantially half way in from the flap, and due to the substantial support provided by the fold of the back forming layer 11, where it is adhesively connected to the interliner, the folded upper edge of the collar will be maintained in smooth non-wilting relation.

The band portion of the collar, in addition to being relatively soft at its inner surface where it comes in contact with the neck is also relatively soft at its outer surface below the lower edge of interliner 16 so that the collar will more readily conform to the neck and at the same time a smooth walled space is provided between the band and the flap for engagement and movement of the necktie.

The collar is secured to the shirt 33 as shown in Figs. 18 and 19. As shown in Fig. 18 the edge of the shirt is aligned with the downwardly projecting unhemmed edges of the band portion 14 of the face forming layer 10 and the band interliner 20, and is secured by a line of stitching 34 which is clear of the hem 27 of the back layer 11. Thereupon these stitched together edge portions of the collar and shirt are turned inwardly beneath the hemmed edge 27, as shown in Fig. 19, and secured by a row of stitching 35.

I have illustrated and described a preferred and satisfactory embodiment of the invention, but it will be understood that changes may be made therein, within the spirit and scope thereof, as defined in the appended claims.

Having thus described my invention, what I do claim and desire to secure by Letters Patent is:

1. In a turned collar, a pair of one-piece outer layers of fabric, one being a face forming layer and the other a back forming layer and each comprising a band portion and a flap portion, the ends of the band portions extending beyond the ends of the flap portions, a longitudinal stiffening band interliner having a multi-thickness folded upper edge part secured by a line of stitching contiguous to its fold to the inturned side of the band portion of said face forming layer along a longitudinal line substantially dividing the band and flap portions, and constituting a fixed folding guide upon said face forming layer, about which the flap portion of the collar is foldable downwardly with respect to the band portion with said band interliner and said back forming layer enclosed between the band and folded down flap portions of said folded face forming layer, and a longitudinal four-edged stiffening flap interliner secured along one longitudinal edge and along its two end edges by stitching to the inturned side of said face forming layer and having its other longitudinal edge extended in unstitched relation between its stitched end edges and disposed in the band of the collar between said back forming layer and said band interliner, whereby said unstitched edge is capable of longitudinal and transverse shifting movement relatively to said outer back forming layer and said band interliner.

2. The invention as defined in claim 1, further characterized in that said flap interliner is formed entirely of fusible material and said band interliner is formed entirely of non-fusible material, said flap interliner being contactingly engaged with the flap portion of said face forming outer layer, and said non-fusible band interliner being interposed between the lower marginal portion of said flap interliner and the band portion of said face forming layer, whereby said face forming layer is in direct contact with fusible interliner material throughout its flap portion and is entirely out of contact with fusible interliner material in its band portion.

ANGELO M. PANETTIERI.